July 28, 1925.
C. V. ZOUL
1,547,712
PROCESS FOR DEEMULSIFYING LIQUIDS
Filed Dec. 26, 1922
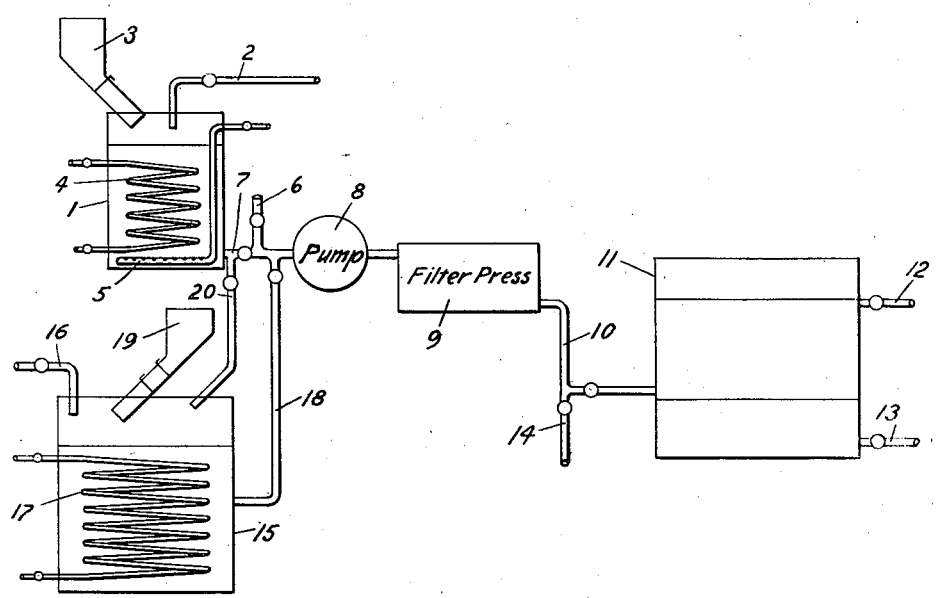
Inventor
Charles V. Zoul
by Arthur P. Knight
Attorney Patented July 28, 1925.

1,547,712

UNITED STATES PATENT OFFICE.

CHARLES V. ZOUL, OF SANTA MONICA, CALIFORNIA, ASSIGNOR TO THE CELITE COMPANY, OF LOS ANGELES, CALIFORNIA, A CORPORATION OF DELAWARE.

PROCESS FOR DEEMULSIFYING LIQUIDS.

Application filed December 26, 1922. Serial No. 609,095.

*To all whom it may concern:*

Be it known that I, CHARLES V. ZOUL, a citizen of United States, residing at Santa Monica, in the county of Los Angeles and State of California, have invented a new and useful Process for Deemulsifying Liquids, of which the following is a specification.

This invention relates to the separation of the constituents of emulsions or liquids composed of a liquid or a solid dispersed in a liquid in which it is insoluble or immiscible. The invention is particularly applicable to the breaking up of emulsions of water and oils or fats, whether animal, marine, vegetable or mineral, but is applicable also to other emulsions or disperse systems.

The main object of the present invention is to provide for de-emulsifying such emulsions by subjecting the emulsion to contact with a material which will act as the de-emulsifying agent by absorbing or withdrawing an emulsifying agent from the emulsion. I have found that by subjecting emulsions, for example, emulsions of oil in water or fat in water, to contact with finely divided solid material such as wood pulp under proper conditions, that the emulsifying quality or property of the liquid is eliminated so that the liquid after such treatment readily settles or separates into its constituents. I have also found that in this operation a more effective de-emulsification can be secured by causing the wood pulp or other de-emulsifying agent to be first brought into contact with, or wetted with, one of the constituents of the emulsion; namely, for example, the oleaginous constituent, and an important part of the present invention is to carry on the operation in such manner as to insure such initial contact of one of the constituents with the de-emulsifying agent.

A further object of the invention is to provide for, carrying out the de-emulsifying operation under certain conditions so as to avoid loss of one of the constituents of emulsion; for example, a more volatile constituent such as gasoline. For this purpose my invention provides for carrying out the de-emulsifying operation wholly in enclosed chambers or apparatus so as to avoid evaporation of such volatile constituent.

The action of the wood pulp or other finely divided material in de-emulsifying certain emulsions, for example, emulsions of oil and water, is presumably due to the absorption or adsorption, by the material, of certain emulsifying or dispersing agents, either solid, liquid or gaseous, present in the emulsion. After the emulsion has been in contact with such material the constituents of the emulsion readily separate, and such separation may be, and preferably is, effected by settling, centrifugal or other operation dependent on the difference in densities of such constituents.

As a de-emulsifying agent I may use any of a variety of finely divided solid fibrous materials, either organic or inorganic, for example, finely divided ligneous or cellular materials, including wood pulps, (soda sulphite or mechanical wood pulp), straw pulp, sawdust, bagasse, or other vegetable fibrous material, (industrial cotton waste or lint); wool waste fiber, cotton or wool felt fiber, asbestos fiber (either amphibole or chrysotile), slag wool, or glass wool; or any mixture of any two or more of these materials; and a mixture of diatomaceous earth or other finely divided mineral material and wood pulp or other fibrous material may also be used with advantage.

The accompanying drawing is a diagrammatic side elevation of apparatus suitable for carrying out the invention.

Referring to said drawing the apparatus shown therein comprises a tank 1 for receiving precoating material including oil supplied by pipe 2, and finely divided material such as diatomaceous earth or wood pulp supplied by suitable feed means 3. Said tank is further provided with heating means such as a steam coil 4 and with means indicated at 5 for introducing air into the body of liquid in the tank for agitating the same.

From the tank 1 a pipe line 7 may lead to a pump 8 by which the precoating mixture is forced into and through a filter-press indicated at 9, the outlet pipe 10 from said filter-press leading to a settling tank 11, having outlet pipes 12 and 13 for drawing off oil and water respectively. Said outlet pipe 10 of the filter press may further be provided with a pipe 14 through which the precoating oil may be discharged.

15 indicates a tank or reservoir for the emulsion to be treated, said tank or reservoir having means indicated at 16 for supplying the emulsion thereto and with heating means such as steam coil 17. An outlet pipe 18 leads from the tank 15 to a suitable pump for forcing the emulsion into the filter-press, for example, to the pump 8 aforesaid. Suitable valves are provided in the various pipes, as indicated, to control the flow of liquid therethrough.

My invention may be carried out in the following manner: A quantity of de-emulsifying agent consisting of wood pulp, or other finely divided fibrous material having suitable adsorptive properties, preferably in dry condition, is first mixed in tank 1 with a suitable oil, for example, oil of the same kind as is contained in the emulsion to be treated, except that the oil which is mixed with the de-emulsifying agent is in dried or dehydrated condition. Such dehydration or drying of the oil may be effected by heat or by blowing air through a body of the oil, preferably while it is heated, or, if desired, a portion of the oil dehydrated by the operation of this invention, may be used. Or the oil in tank 1 may be heated and de-emulsifying agent added thereto and air blown through the mixture, the resulting dry mixture of oil and diatomaceous earth being forced through the filter press to form the coating referred to hereinafter. Or the water in the oil may be absorbed in a separate lot of absorbent material, such as wood pulp, etc., which is then filtered out and the oil so dried mixed with fresh de-emulsifying agent to form the suspension for coating the filter surface of the filter press. The use of dry or anhydrous oil in making the mixture is desirable in that it makes both the finely divided material and the filtering surfaces water repellant. In practice I find it advisable to wet the wood-pulp or other finely divided fibrous material and the filtering medium with the constituent which forms the outer or continuous phase of the emulsion in order to obtain the best results. Sufficient oil is taken in any case to suspend the wood pulp, or other de-emulsifying agent used for the process to form a sufficiently mobile liquid to enable it to be pumped and forced through a filter press. The mixture of de-emulsifying agent and dried oil is then pumped or forced through filter press 9 so that the de-emulsifying agent is arrested by the filter surface or medium (filter cloth) and forms a so-called pre-coat or a coating of the de-emulsifying agent on the filter surface or medium, the thickness of this pre-coat or coating depending on the amount of de-emulsifying agent used and being from say $\frac{1}{16}$ of an inch to $\frac{1}{8}$ inch or over according to the requirements of the process. If necessary the mixture of dehydrated oil and wood pulp or other de-emulsifying agent used in the above described operation may be heated for example, by means of steam coil 4 to increase the fluidity of the mixture which is forced into the filter press. The filter press 9 may be of any suitable type, for example it may be of the plate, or "plate and frame" type and the pressure used in the operations herein described will in any case be controlled so as to provide for the required velocity of filtration.

In some cases it will be found that the "liquor spaces" in the filter press, will contain considerable de-emulsifying agent in suspension in the oil, and in order to insure deposition of such suspended material on the filter cloths, clear dry oil, of the same kind as that being treated, but free from water, may be supplied through pipe 6 to the pump and be forced through the filter press until all of the de-emulsifying agent is deposited as a coating on to the cloth.

The emulsion to be treated consisting, for example, of emulsion of petroleum and water, is then pumped from tank 15, for example by means of pump 8, or otherwise caused to flow under pressure into the filter press and through the filtering medium and the pre-coat or coating formed thereon, as above described. In case the emulsion to be treated is sufficiently fluid at ordinary temperatures, it may be forced into the filter press without heating, but in case the emulsion is of a viscous nature, it may be heated by steam coil 17 or other suitable heating means, say to 100° to 160° F., more or less, so as to render it sufficiently fluid to be forced readily into and through the filter press; in any case the temperature of the emulsion should not be raised much above the boiling point of any volatile constituent, such as gasoline, or any volatile solvent present therein in any considerable quantity. In order to insure that there will be no loss of such volatile constituent, I prefer to carry out the entire operation including the heating of the emulsion, if necessary, pumping of same, the filtration thereof in the filter press, and withdrawal of the filtrate from the filter press, in completely enclosed apparatus; the main emulsion supply or heating tank 15, the pump 8, the filter press 9 and the supply and outlet connections therefor, including pipes 18 and 10, being all enclosed substantially gas tight, so as to prevent escape of gasoline or other volatile constituent therefrom. In passing through the filter press, the emulsion is brought temporarily into contact with the pre-coat or coating of diatomaceous earth within the filter press, and the emulsion is thereby eliminated by absorption of emulsifying agent in the emulsion by the diatomaceous earth, so that the filtrate which passes through the filter press and into tank 11 and which contains, for example both the oil and water of the emulsion, readily separates on standing in said tank into its oil and water constituents. The pre-coating or provision of an oil wetted coat of the de-emulsifying agent on the filtering surface in the filter press, not only enables a cleaner and more rapid filtration of the emulsion and a more effective removal of the filtering agent, but enables a given quantity of de-emulsifying agent to treat or de-emulsify an extremely large quantity of emulsion without losing its de-emulsifying property.

The filtrate or liquid which passes through the filter press may either be allowed to stand in tank 11 or be subjected to any other operation such as centrifuging, to effect settling or separation by gravity or difference in density of the oil and water, or other immiscible constituents thereof. In case the liquid contains a volatile constituent such settling or separating action is preferably effected in an enclosed chamber so as to prevent escape and loss of such volatile constituent during the settling or separating operation.

The process is applicable to any emulsion, for example, emulsions of tallow or fat and water, such as are produced in the tallow or lard industries, the tallow or fat being in that case heated to sufficient temperature to produce an emulsion which is sufficiently fluid to enable it to be pumped through a filter press with the required rapidity, and in general in the treatment of any emulsion by this process, the filtering and settling operations will be effected at a temperature which is most suitable and economical for the purpose, the emulsion being heated, if necessary, to bring it to such temperature as will provide for the desired rapidity of filtration and of settling after the emulsion has been broken up by the filtration through the de-emulsifying agent.

The amount of de-emulsifying agent required for the de-emulsification of the emulsion will vary according to the character of the emulsion, the amount of de-emulsification required, and the particular de-emulsifying agent used, and may if necessary be determined by trial for each set of conditions. I have obtained satisfactory de-emulsification by use of a wood pulp in approximately the proportion of from one-tenth per cent to one per cent with a petroleum emulsion, and other finely divided solid materials as above specified can also be used; suitable combinations as to quantities used, pressure and rate of filtration and temperature at which the operation is carried out, being provided for according to the requirements of each case. In this manner the water content of a petroleum emulsion may be reduced from say forty-five per cent to less than one per cent.

The thickness of the pre-coat or coating formed on the filter press filtering medium, may be varied according to requirements and the pressure at which the filter press is operated may also be varied so as to obtain a more thorough de-emulsification or a higher rate of flow. Moreover said variation of thickness of the pre-coat or coating of the finely divided solid de-emulsifying agent, may be effected either before or during the run of the emulsion through the filter press. Thus, if it is found by reason of variation in condition of the emulsion being treated that the coating is too thin, it may be built up to a greater thickness by temporarily passing a quantity of finely divided solid de-emulsifying agent suspended in dried oil from pre-coat tank through the filter press until the required thickness of coating is attained. Or, in such cases additional de-emulsifying agent may be added by any suitable means 19 to the emulsion in tank 15 and be mixed with the emulsion which is being forced through the filter press, to increase the thickness of the coating therein.

In some cases, I may provide for forming the precoat or coating on the filtering medium by first forming a mixture of finely divided solid de-emulsifying agent with oil, for example, oil of the same kind as is contained in the emulsion to be treated and then mixing this suspension of de-emulsifying agent in dried oil in the emulsion to be treated, the resulting mixture being forced into and through the filter press with the result that a pre-coat or coating of de-emulsifying agent is formed on the filter medium in the filter press and the emulsion which passes through such coating loses its emulsifying property so that the filtrate passing from the filter press readily separates into the oil and water constituents thereof. In such cases the de-emulsifying agent may be mixed with the dry oil in any suitable tank, for example the precoat tank 1, and the resulting suspension may be mixed with the emulsion by pumping from both tanks 1 and 15 at the same time, or the suspension of de-emulsifying agent in clean oil at the same time, or the suspension of de-emulsifying agent in clean oil may be mixed directly with the emulsion in tank 15 by means of pipe 20. When the filter medium of the filter press has thus been coated to the required thickness by the de-emulsifying agent the straight or unmixed emulsion at suitable temperature is forced through the filter press to de-emulsify the same, this operation being continued as long as the coating formed on the filter press or filtering medium retains its de-emulsifying property to a satisfactory degree, the filtrate passing through the filter press being subjected to suitable separating action, by settling or otherwise, to recover the oil separated from the water. If desired, the operation may be carried out so that the mixture, formed by suspending de-emulsifying agent in dry oil and adding the product to the emulsion may be supplied to the filter press during the whole operation, in which case the coating of de-emulsifying agent on the filter surface gradually builds up or increases in thickness during the whole operation.

The formation of an oiled pre-coat on the filter medium in the filter press, is generally desirable in order to render the de-emulsification more effective and rapid, but with some emulsions, for example, fish oil or animal oil emulsions, a small percentage of the finely divided solid de-emulsifying agent should be added to the main body of the liquor in addition to the pre-coat formed. My invention may be applied to the de-emulsification of tallow, produced by steam rendering of animal fats; such tallow containing about one-half to three per cent of water which does not settle out on melting the tallow, and is, therefore, emulsified with the tallow, removal of such water improving the keeping qualities and increasing the desirability of the product. The tallow is heated to about 200° F. and about one per cent of finely divided de-emulsifying agent added and mixed with the melted tallow emulsion, and the liquid mixture then pumped through a filter press while still hot, the melted tallow and the water content thereof passing freely through the filter press, but the de-emulsifying agent being retained in the filter press, together with any materials absorbed or adsorbed thereby. If a bleaching effect is desired, a certain amount of fuller's earth, say two or three per cent, may be added to the liquid before the filtering operation, or it may be added after the filtering operation, and the filtration afterward repeated. Air may be blown through the heated emulsion either before or after the addition of de-emulsifying agent thereto. After the tallow and water have been treated with de-emulsifying agent, as above described, and passed through a filter press, they are readily separable by filtering and by allowing the filtered liquid to stand in a receptacle, or to move through a receptacle with sufficiently low velocity, the water is caused to settle out and the melted tallow is decanted therefrom substantially free from water. The bleaching effect of the fuller's earth is much more pronounced and effective when the tallow has been de-emulsified by the action of the de-emulsifying agent, as above described.

In the extraction of fats or oils from animal or vegetable products, by the use of a solvent, such as gasoline, benzol or alcohol, emulsions are liable to occur, containing the fat or oil as well as other substances, emulsified in the saturated solvent. My process of treatment with de-emulsifying agent, for example wood pulp or other vegetable fibrous material, as above described, may be used to break up such emulsions, the solution of the fat or oil in the solvent being then separated from the undissolved fat or oil or other substances such as water by settling following the filtration. For example, this process may be applied with advantage to the extraction of linseed oil, using gasoline as a solvent. In such extraction, the resulting solution is generally cloudy, but by filtering it through a layer of de-emulsifying agent, which has been wetted with one of the constituents of the emulsion, in the manner above described, or by adding finely divided de-emulsifying agent to it and then filtering, the emulsifying property is destroyed, so that a clear solution is obtained by allowing the liquid to stand and settle. Such clear solution is then treated in the usual manner, to recover the solvent.

Wood pulp or any of the other mentioned finely divided solid de-emulsifying agents may be used in any of the processes above described, or a mixture of any two or more of them.

I am aware that it has been proposed to pass emulsions through diatomaceous earth or other porous material to break up the emulsion, but such processes have not heretofore been successful for the reason that they were not carried out in such manner as to form a uniform and effective de-emulsifying coating of porous material on the filter member, as above described, and, furthermore, did not allow treatment of large volumes of emulsion during one operation, making the process of de-emulsification uneconomical and in particular no provision was made for ensuring the uniform wetting of the porous material with the oily or outer phase constituent of the emulsion, this being essential in many cases for successful operation of the process.

In the case of mineral oils the passage of the emulsified crude oil through the pre-coat removes all asphaltic impurities, earth, sediment, carbon or clay particles and all other substances which make up "B. S." The effect of this preliminary treatment through which the crude oil passes is observed in the case of refining later on, reduction of residual matter in the stills and the yield and quality of distillates.

The oil used for suspending the wood-pulp or other finely divided solid material used in forming the pre-coat may be any suitable liquid, for example, gasoline, kerosene or other solvent, if desired, in place of the dried oil as above stated.

In applying pre-coat of diatomaceous earth, wood-pulp, or other finely divided solid material, as above indicated it is necessary to use a uniform and rapid flow of this suspension through the filter press. This is best obtained by using low pressure on the pre-coating liquor thus obtaining a pre-coat which has been applied without any opportunity for compacting, segregating or otherwise gravitationally classifying. Such a detailed operation carefully controlled, gives a pre-coat of highest efficiency for de-emulsification.

In any particular case the agent to be used will be determined by the relative economy of same, taking into consideration the cost of the material, the rate of de-emulsification effected thereby and the amount of de-emulsification that can be effected by a given amount of material. In case two or more of the said de-emulsifying materials are used in the same process or in case diatomaceous earth and wood pulp are used together, they may be applied to the pre-coating liquid simultaneously and in any desired proportion, so as to form a pre-coat formed of both or all of the emulsifying agents, such as diatomaceous earth and wood-pulp, or they may be applied successively so as to form, say, first a pre-coat of diatomaceous earth, and then a pre-coat of wood-pulp, so that the said pre-coats act successively on the emulsion to be de-emulsified.

What I claim is:

1. A process for treating emulsions of oil and water which consists of mixing wood pulp with pre-dried oil of the same character as in the emulsion, allowing such mixture to flow through a filtering machine at low pressure and at a high rate of flow so as to form a coating of wood pulp on the filtering medium of said filtering machine, forcing the emulsion through such coating and subjecting the filtrate to separating action to separate the constituents thereof.

2. A process as set forth in claim 1 in which the emulsion to be treated is subjected to a heating operation to increase its fluidity preparatory to being forced through the said coating.

3. The process which consists in mixing wood pulp with substantially anhydrous oleaginous liquid, forcing the liquid through a filtering medium so as to form a coating of wood pulp on said medium and then forcing an emulsion of oil and water through the coating so formed to eliminate the emulsifying property in said emulsion and then subjecting the broken emulsion to a separating action dependent on the difference in density of the oil and water constituents thereof so as to recover the said constituents separately.

4. A process as set forth in claim 3, in which the emulsion to be treated is subjected to a heating operation to increase its fluidity preparatory to being forced through the said coating.

5. A process as set forth in claim 3 in which the de-emulsifying and separating operations are carried on in enclosed receptacles and out of contact with the atmosphere to avoid evaporation of a volatile constituent.

6. The process for treating emulsions of oil and water which comprises mixing finely divided fibrous material with predried oil of the same character as in the emulsion, allowing such mixture to flow through a filtering machine so as to form a coating of such finely divided fibrous material on the filtering medium thereof, forcing the emulsion to be treated through such coating and subjecting the filtrate to separating action to separate the constituents thereof.

7. A process for treating emulsions of oil and water which comprises mixing diatomaceous earth and wood pulp with predried oil of the same character as in the emulsion, allowing such mixture to flow through a filtering machine so as to form a coating of diatomaceous earth and wood pulp on the filtering medium thereof, forcing the emulsion to be treated through such coating, and subjecting the filtrate to separating action to separate the constituents thereof.

8. A process for treating emulsions of oil and water which comprises mixing finely divided vegetable fibrous material and finely divided mineral material with pre-dried oil of the same character as in the emulsion, allowing such mixture to flow through a filtering machine so as to form a coating of such finely divided materials on the filtering medium, forcing the emulsion to be treated through such coating, and subjecting the filtration to separating action to separate the constituents thereof.

9. A process for treating emulsions of oil and water which comprises mixing a finely divided vegetable fibrous material with pre-dried oil of the same character as in the emulsion, allowing such mixture to flow through a filtering machine so as to form a coating of such finely divided vegetable fibrous material on the filtering medium thereof, forcing the emulsion to be treated through such coating, and subjecting the filtrate to separating action to separate the constituents thereof.

In testimony whereof I have hereunto subscribed my name this 18th day of December, 1922.

CHARLES V. ZOUL.